Patented Apr. 13, 1948

2,439,765

UNITED STATES PATENT OFFICE 2,439,765

SUPPORTED METAL ACETYLIDE CATALYST

Joseph Frederic Walker, Westfield, N. J., and Thomas Edward Londergan, Niagara Falls, N. Y., assignors to E. I. du Pont de Nemours & Company, Wilmington, Del., a corporation of Delaware No Drawing. Original application October 30, 1944, Serial No. 561,150. Divided and this application October 31, 1946, Serial No. 707,046

3 Claims. (Cl. 252—227.5)

This invention relates to a catalyst material, and more particularly it relates to a new and improved catalyst material comprising a metal acetylide on a catalyst support. This is a division of our abandoned copending application Serial No. 561,150, filed October 30, 1944.

U. S. Patent No. 2,232,867 to Reppe et al., discloses the preparation of a catalyst material comprising a metal acetylide on a catalyst support and its use in the production of alkinols. The catalyst material disclosed in this patent is, however, very unsatisfactory in view of its high susceptibility to detonation by either mechanical shock or flame.

It is an object of this invention to produce a catalyst material comprising a metal acetylide on a catalyst support which has a low susceptibility to detonation by mechanical shock or flame.

It is another object of this invention to provide a method for the production of a catalyst material comprising a metal acetylide on a catalyst support which has a low susceptibility to detonation by mechanical shock or flame.

It is a specific object of this invention to produce a catalyst material comprising a copper acetylide on a catalyst support which is substantially unsusceptible to detonation by mechanical shock or flame.

Other objects of the invention will appear hereinafter.

The objects of this invention are accomplished, in general, by producing a catalyst material comprising very finely divided particles of a catalyst support containing, uniformly distributed in the mass of said particles, a metal acetylide, said catalyst material containing not to exceed 20% by weight of said metal acetylide.

The above-said catalyst material can be produced by thoroughly mixing finely divided particles of a catalyst support with an aqueous solution of a metal salt and precipitating the metal acetylide from said metal salt solution by passing acetylene through said mixture. The quantity of metal acetylide precipitated in the mass of particles of catalyst support must not exceed 20%, by weight, of the final dry catalyst material. To still further lessen the detonation hazard of the catalyst, or in some cases completely eliminate the detonation by mechanical shock or flame, it is essential that the particles of catalyst support have a size not to exceed 300 mesh.

The present invention contemplates, broadly, the production of any metal acetylide catalyst material; however it particularly contemplates catalysts taken from the group consisting of copper acetylide, silver acetylide, gold acetylide and mercurous mercury acetylide. The acetylides of this group, when dry, are explosive in nature, and the present invention provides a highly important process for the production of catalyst material containing these acetylides which catalyst material will have high efficiency and a low susceptibility to detonation. Furthermore, this particular group of catalysts have excellent utility in the catalytic production of alkinols as disclosed in the above-mentioned Reppe et al. patent. The invention will hereinafter be largely described and illustrated with particular reference to copper acetylide. It is to be understood, however, that such specific description is equally applicable to the other explosive metal acetylides; silver acetylide, gold acetylide and mercurous mercury acetylide.

As a catalyst support, the present invention contemplates the use of any of the well-known inert materials used as a support or carrier for catalysts. Such catalyst supports include, for example, animal charcoal, glowed wood charcoal, active carbon, infusorial earth, fuller's earth, silica gel, active alumina, Carborundum, and the like. It has been found, in accordance with this invention, that the particle size of the support is critical and very important. When used for supporting explosive metal acetylides, the particle size of the catalyst support will determine, to a large extent, the explosiveness of the catalyst material. In order to obtain a satisfactorily effective catalyst it is necessary that the particle size of the support be 300 mesh or finer. By "300 mesh" is meant, of course, that the particles will pass through a screen having 300 meshes per linear inch. The following table discloses the detonative properties of a number of dry catalyst masses comprising copper acetylide precipitated on a number of different catalyst supports of different particle sizes. In each case the catalyst material or mass comprises a ratio of copper acetylide to support of 1:5. The sensitivity to mechanical shock was determined by tapping the same with a hammer, and the sensitivity to flame was determined by passing the same on a fine screen over a Bunsen burner.

| Support | Particle Size | Sensitivity When Dry | |
|---|---|---|---|
| | | Mechanical Shock | Flame |
| Glowed wood charcoal | 60-200 mesh | Detonated | Detonated. |
| Do | 100-200 mesh | do | Do. |
| Do | 200-300 mesh | Insensitive | Burned with few sparks. |
| Do | 300 mesh and finer | do | Insensitive. |
| Active carbon | Pellets | Detonated | Detonated. |
| Do | 300 mesh and finer | Insensitive | Insensitive. |
| Active silica | 100 mesh and finer | do | Detonated. |
| Do | 300 mesh and finer | do | Insensitive. |

The metal acetylide should be uniformly distributed throughout the mass of the catalyst support. It is well known that metal acetylides can be precipitated from metal salt solutions, for example aqueous solutions of copper chloride, copper phosphate, copper acetate, ammoniacal copper sulfate, ammoniacal copper chloride, silver nitrate, mercurous acetate, ammoniacal gold-sodium thiosulphate, by passing acetylene through such solutions. In order that the metal acetylide be uniformly distributed throughout the support, the finely divided support should be thoroughly mixed with the metal salt solution before the metal acetylide is precipitated. Preferably, the mixture is agitated during precipitation. Mixing precipitated metal acetylide with the finely divided support does not give equivalent results since the resultant catalyst material contains agglomerated, discrete particles of acetylide which are sensitive to mechanical shock or heat and may cause serious explosions.

The catalyst material must contain at least four parts of support material for each part metal acetylide to produce a catalyst material which is not subject to serious explosion. In view of the greater explosive character of silver acetylide, it is preferred that the catalyst material contain at least ten parts of support material for each part silver acetylide. Catalyst material containing mixtures of silver acetylide with the other metal acetylides are preferably prepared with such ratio of support to acetylide as is proportional to the mixtures, in accordance with the above guides. The correct ratio of support to acetylide can be obtained by mixing such proportion of metal salt solution and catalyst support as will produce the desired ratio upon completing the precipitation of the acetylide.

In some instances, it has been found that non-explosive catalyst material can be made with precipitated gold and mercury acetylide containing as high as 35% acetylide, based on the total weight of the catalyst material. For purposes of safety, it is not advisable, however, to prepare catalysts containing more than 20% by weight of these two acetylides.

The following detailed examples are given to illustrate certain preferred processes for producing the catalyst materials of the present invention. It is to be understood, however, that the invention is not to be limited to the details set forth in these examples.

*Example I*

An ammoniacal copper sulfate solution was prepared by dissolving 79.2 grams of hydrated copper sulfate ($CuSO_4 \cdot 5H_2O$) in 800 cc. of water and adding 240 cc. of 28% aqua ammonia to this solution. The copper solution was then reduced by dissolving 192 grams of hydroxylamine hydrochloride and 120 grams of powdered (300 or finer mesh) active carbon were slowly stirred in with cooling. Acetylene was bubbled through the resultant suspension with agitation for about thirty minutes. The catalyst was removed from the solution by filtration and washed well with water. The moist catalyst was then washed with acetone and vacuum dried. The dry product presented the appearance of a uniform black powder on examination under the microscope. It did not explode on being subjected to mechanical shock or flame. On ignition, it burned in exactly the same manner as the active carbon employed in its preparation. The ratio of support to copper acetylide in the final dry catalyst material was approximately 5 to 1.

*Example II*

Catalysts were prepared by the procedure described in Example I but 300 or finer mesh fuller's earth and 300 mesh or finer infusorial earth were substituted for the carbon support. The catalysts obtained were not sensitive to flame or mechanical shock.

*Example III*

Silver acetylide catalyst was prepared by diluting 17 ml. 0.1 N silver nitrate solution with 50 ml. water, adding 2 ml. aqua ammonia (28% $NH_3$), mixing with 2.0 grams of Nuchar GFO (300 mesh or finer), a form of carbon produced by Industrial Chemical Sales Division of West Virginia Pulp and Paper Company, 1334 New York Central Building, New York, N. Y., and bubbling acetylene through the solution for fifteen minutes. This supported catalyst, corresponding to a carbon: silver acetylide ratio of 10:1, was insensitive to shock or flame.

*Example IV*

Supported gold acetylide catalyst was prepared by dissolving 0.47 gram of sodium gold thiosulfate (equivalent to 0.2 gram of gold acetylide) in 40 ml. of water, adding 10 ml. aqua ammonia (28% $NH_3$), mixing with 0.4 gram of Nuchar GFO, and bubbling acetylene through the mixture for one hour. The resulting catalyst, containing 32.1% gold acetylide by analysis, was insensitive to mechanical shock or flame although gold acetylide, prepared in an identical manner without the support, was detonated readily with shock or flame. A similar safe catalyst was prepared which contained 4.0 parts of Nuchar GFO to 1.0 part of gold acetylide, and this catalyst is recommended to provide a satisfactory margin of safety.

*Example V*

Mercury acetylide was prepared by suspending 2.5 grams mercurous acetate, equivalent to 2.0 grams mercury acetylide, and 4.0 grams of Nuchar GFO in 100 ml. of water and bubbling acetylene through the suspension for 25-30 hours with agitation. Light was excluded during the reaction. The resulting supported catalyst was insensitive to shock or flame. A mixture containing 4.0 parts Nuchar GFO to 1.0 part mercury acetylide is recommended to provide a satisfactory margin of safety.

The catalyst material of the present invention will have a very low susceptibility to detonation by mechanical shock, or when subjected to heat or flame. In the case of copper acetylide catalysts prepared by the process of this invention, there is substantially no susceptibility to detonation or explosion. Since the catalysts of this invention have particular utility for carrying out acetylene reactions, their non-explosive character has marked advantages over previously known metal acetylide catalysts. After use in acetylene reactions, the catalysts of this invention are still active and still insensitive to shock or flame.

Since it is obvious that many changes and modifications can be made in the above-described details without departing from the nature and spirit of this invention, it is to be understood that the invention is not to be limited to the abovesaid details except as set forth in the appended claims.

What is claimed is:

1. A copper acetylide catalyst material consisting essentially of particles of a catalyst support having a size not to exceed 300 mesh and, uniformly distributed therein, said copper acetylide, said catalyst material containing not to exceed 20% by weight of said copper acetylide.

2. A silver acetylide catalyst material consisting essentially of particles of a catalyst support having a size not to exceed 300 mesh and, uniformly distributed therein, said silver acetylide, said catalyst material containing not to exceed 10% by weight of said silver acetylide.

3. A metal acetylide catalyst material consisting essentially of a mass of finely divided particles of a catalyst support having a size not to exceed 300 mesh and, uniformly distributed therein, a heavy metal acetylide selected from the group consisting of the acetylides of copper, silver, gold, and mercurous mercury, said catalyst material containing not to exceed 10% by weight of said acetylide when said acetylide is silver acetylide, and not to exceed 20% by weight of said acetylide when said acetylide is the acetylide of copper, gold or mercury.

JOSEPH FREDERIC WALKER.
THOMAS EDWARD LONDERGAN.

REFERENCES CITED

The following references are of record in the file of this patent:

UNITED STATES PATENTS

| Number | Name | Date |
|---|---|---|
| 2,232,867 | Reppe et al. | Feb. 25, 1941 |